United States Patent Office 3,595,825
Patented July 27, 1971

3,595,825
RESINS AND CATALYST COMPOSITIONS THEREFOR
Russell Alexander Lindsey Miller, Bishopbriggs, Scotland, assignor to Imperial Chemical Industries Limited, London, England
No Drawing. Filed May 10, 1968, Ser. No. 728,322
Claims priority, application Great Britain, May 16, 1967, 22,724/67
Int. Cl. C08g *31/16*
U.S. Cl. 260—31.2
11 Claims

ABSTRACT OF THE DISCLOSURE

The present compositions are provided which are suitable for the production of laminates. The resin composition contains special catalyst system which allows the resin composition to be cured in very short times at low temperatures. Additionally the resin composition provides laminates, which when cured, are very hard and rigid laminates. The composition contains an organopolysiloxane resin having 1 to 1.6 organo groups per silicon atom which are connected to the silicon by a C-Si linkage, a lead salt selected from 2-ethylhexoate and 3,5-trimethylhexoate, butyltin 2-ethylhexoate and iron octoate.

---

This invention relates to organopolysiloxane resins and catalyst compositions therefor.

Organopolysiloxane resins are readily available and widely used, for example, for the preparation of laminates. These resins are normally caused to polymerise and set to a tough flexible tack-free condition by the addition of a catalyst and a subsequent heating of the resin/catalyst mixture. Included among the catalysts which have been used for this purpose are mixtures of lead 2-ethylhexoate with a tin compound such as dibutyltin diacetate or a butyltin 2-ethylhexoate. The hitherto available catalyst mixtures, have not, however, been in all cases entirely satisfactory.

According to the present invention a new and improved resinous composition comprises and organopolysiloxane resin having from 1 to 1.6 organo groups per silicon atom, said organo groups being connected to silicon by a C-Si linkage, 0.01 to 0.06 percent of lead 2-ethylhexoate or lead 3,5-trimethylhexoate, 0.1 to 0.6 percent of a butyltin 2-ethylhexoate and 0.004 to 0.04 percent of iron octoate, all percentages being based on the weight of the organopolysiloxane resin.

The organo groups in the organopolysiloxane resins may be any monovalent hydrocarbyl or substituted hydrocarbyl groups, such as substituted or unsubstituted alkyl, aryl, aralkyl, alkaryl, alkenyl, cyclo-alkyl or cyclo-alkenyl groups. Substituents which may be present in the organo groups include, for example, fluorine and chlorine. Suitable groups which may be used include, for example, methyl, phenyl, vinyl and cyclohexyl groups. In general it is preferred that the organo groups be alkyl or aryl and for many purposes methyl groups with or without a proportion of phenyl groups are particularly preferred.

While the proportion of organo groups to silicon atoms may vary from 1:1 to 1.6:1 it is in general preferred that it should be not greater than 1.2:1.

In addition the resin may contain a proportion of organo groups in which the linkage to silicon is a C-O-Si linkage, such as alkoxy groups. It is in fact preferred that the resins of our compositions should contain a proportion of methoxy groups.

The catalyst in our compositions is a mixture of a lead salt which may be lead 2-ethylhexoate or lead 3,5-trimethylhexoate, a tin salt which may be butyltin tri-2-ethylhexoate, dibutyltin di-2-ethylhexoate or tributyltin 2-ethylhexoate and ion actoate.

The lead, tin and iron salts must be present in proportions such that there is from 0.01 to 0.06 percent of lead salt, 0.1 to 0.6 percent of the tin salt and 0.004 to 0.04 percent of the iron salt all calculated as a percentage of which the weight of resin. Within these limits the proportions of the three salts may vary widely.

The resin compositions of our invention may, if desired, contain other materials such as fillers, pigments and the like. Suitable fillers which may be used include, for example, asbestos, glass fibres and various kinds of silica.

Our compositions are in some cases preferably in the form of solvent solutions. Types of solvent which may be used include aliphatic and aromatic hydrocarbons, alcohols, ethers, esters and ketones. Suitable solvents which may be used include, for example, toluene, xylene, isopropyl alcohol, acetone and diethyl ether either alone or in admixture. Preferred solvents are toluene, xylene and isopropyl alcohol. When a solvent is used the organopolysiloxane resin may be present in widely varying proportions, for example, from 10 to 60 percent by weight of resin solvent. It is, however, in general preferred to use from 40 to 60 percent of resin.

The compositions may be used for the preparation of laminates of, for example, glasscloth and asbestos paper or cloth. They may also be used for the production of moulding powders.

The catalysts used give products with satisfactory properties after curing for shorter periods or at lower temperatures than is necessary with the hitherto available catalysts used for organopolysiloxane resins.

Our invention is further illustrated by the following examples in which all parts and percentages are by weight except where otherwise stated.

EXAMPLE 1

A composition was made up consisting of organopolysiloxane resin of composition 7 mol percent ($Me_2SiO$), 2 mol percent ($MeSiO_{3/2}$), 9 mol percent ($PhSiO_{3/2}$) and and 82 mol percent [$Me(OMe)SiO$], containing 0.5 percent of dibutyltin di-2-ethylhexoate, 0.02 percent lead 3,5,5-trimethylhexoate and 0.008 percent of iron octoate.

Asbestos paper was impregnated with the so prepared composition and stacked to form a laminate. The stack was then pressed at 1,000 lb./in.$^2$ and 175° C. for 30 minutes. There was thus obtained a hard rigid laminate. The excess resin which had flowed from between the laminae was hard and brittle.

For purposes of comparison the above procedure was repeated except that the iron octoate was omitted. The laminate obtained in this case had good bond strength but was soft. In addition the excess resin was soft and sticky.

EXAMPLE 2

The procedure of Example 1 was repeated using butyltin tri-2-ethylhexoate in place of the dibutyltin di-2-ethylhexoate. Similar results was obtained.

EXAMPLE 3

The procedure of Example 1 was repeated using tributyltin 2-ethylhexoate in place of the dibutyltin di-2-ethylhexoate. Similar results were obtained.

EXAMPLE 4

The procedure of Example 1 was repeated except that the lead 3,5,5-trimethylhexoate was replaced by lead 2-ethylhexoate. Similar results were obtained.

EXAMPLE 5

The procedure of Example 1 was repeated using asbestos cloth in place of the absestos paper used in Example 1. Similar results were obtained.

EXAMPLE 6

The procedure of Example 1 was repeated using asbestos felt in place of the asbestos paper used in Example 1. Similar results were obtained.

EXAMPLE 7

A composition was made up consisting of an organopolysiloxane resin of composition 30 mol percent (MHeSiO$_{3/2}$), 40 mol percent (PhSiO$_{3/2}$) and 30 mol percent (Me$_2$SiO)$_t$ containing 0.5 percent of dibutyltin di-2-ethylhexoate, 0.02 percent of lead 3,5,5-trimethylhexoate and 0.008 percent of iron octoate. Using this composition laminates of asbestos paper were prepared in the manner described in Example 1. The laminates obtained were similar in properties to those of Example 1.

EXAMPLE 8

A composition was made up consisting of an organopolysiloxane resin of composition 38 mol percent (Me$_2$SiO), 10 mol percent (MeSiO$_{3/2}$) and 52 mol percent (PhSiO$_{3/2}$) containing 0.25 percent of dibutyltin di-2-ethylhexoate, 0.01 percent lead 3,5,5-trimethylhexoate and 0.006 percent of iron octoate. Laminates of asbestos paper are prepared using this composition in the manner described in Example 1. The properties of the so prepared laminates are found to be similar to those of Example 1.

What we claim is:

1. A resinous composition comprising an organopolysiloxane resin having from 1 to 1.4 organo groups per silicon atom, said organo groups being selected from the group consisting of alkyl, aryl, alkenyl and cycloalkenyl groups and connected to silicon by a C–Si linkage, 0.01 to 0.06 percent of lead salt selected from the group consisting of 2-ethylhexoates and 3,5-trimethyl-hexoates, 0.1 to 0.6 percent of a butyltin 2-ethylhexoate and 0.004 to 0.04 percent of iron octoate, all percentages being based on the weight of the organopolysiloxane resin.

2. A composition according to claim 1 wherein the organo groups in the organopolysiloxane resin are selected from the group consisting of methyl, phenyl, vinyl and cyclohexyl groups.

3. A composition according to claim 1 wherein the organopolysiloxane resin also contains a proportion of organo groups in which the linkage to silicon is a C-O-Si linkage.

4. A composition according to claim 4 wherein the said organo groups are alkoxy groups.

5. A composition according to claim 5 wherein the alkoxy groups are methoxy groups.

6. A composition according to claim 1 wherein the composition is in solution in a solvent from the group consisting of aliphatic and aromatic hydrocarbons, alcohols, ethers, esters and ketones and the organopolysiloxane resin is present in amount from 10 to 60 percent by weight of the total.

7. A composition according to claim 6 wherein the solvent is selected from the group consisting of toluene, xylene, isopropyl alcohol, acetone and diethyl ether.

8. A composition according to claim 7 wherein the resin is present in amount from 40 to 60 percent by weight of the total.

9. Shaped articles produced by curing a composition as claimed in claim 1.

10. Laminates bonded by a composition as claimed in claim 1.

11. Laminates according to claim 12 wherein the laminae are selected from the group consisting of asbestos paper, asbestos cloth and glasscloth.

References Cited

UNITED STATES PATENTS

| | | | |
|---|---|---|---|
| 2,881,199 | 5/1959 | Bailey et al. | 260—46.5 |
| 2,934,464 | 5/1960 | Hoffman et al. | 260—46.5 |
| 3,077,465 | 2/1963 | Bruner | 260—46.5 |
| 3,373,053 | 3/1968 | Clark | 260—46.5 |

OTHER REFERENCES

R. N. Meals and F. M. Lewis, Silicones, Reinhold Publishing Corp., New York (1959), pp. 114–115.

E. Singer, Fundamentals of Paint, Varnish and Lacquer Technolgy, American Paint Journal Co. (1957), pp. 48–51.

MORRIS LIEBMAN, Primary Examiner

S. M. PERSON, Assistant Examiner

U.S. Cl. X.R.

260—32.8, 33.2, 33.4, 33.6, 37, 46.5